United States Patent [19]

Clarke

[11] Patent Number: 4,846,320
[45] Date of Patent: Jul. 11, 1989

[54] CABLE HANGER FOR ELECTRICALLY POWERED MINE VEHICLES

[75] Inventor: Dale M. Clarke, Sudbury, Canada
[73] Assignee: Inco Limited, Toronto, Canada
[21] Appl. No.: 117,548
[22] Filed: Nov. 6, 1987
[30] Foreign Application Priority Data Dec. 11, 1986 [CA] Canada .................................... 525022

[51] Int. Cl.[4] ........................................... H02G 11/00
[52] U.S. Cl. .................................... 191/12 R; 248/51; 248/64
[58] Field of Search ...................... 191/12.2 A, 12.2 R, 191/12 R; 248/51, 63, 64

[56] References Cited

U.S. PATENT DOCUMENTS

| | | | |
|---|---|---|---|
| 1,729,781 | 10/1929 | Holmes | 191/12.2 A X |
| 2,264,007 | 11/1941 | Russell | 191/12.2 A |
| 3,882,288 | 5/1975 | Rasmussen | 191/12 R X |
| 4,667,782 | 5/1987 | Toase et al. | 191/12 R |

FOREIGN PATENT DOCUMENTS 712885 1/1980 U.S.S.R. .......................... 191/12.2 R

Primary Examiner—Johnny D. Cherry
Assistant Examiner—Scott H. Werny
Attorney, Agent, or Firm—Raymond J. Kenny; Francis J. Mulligan, Jr.

[57] ABSTRACT

A power cable hanger for a mine including a roof mounted rail, a carriage travelling on the rail, a plurality of open-sided hooks to support a cable spaced at intervals along the path of the rail, an arm on the carriage to pick up and place the cable on the hooks and to retrieve the cable from the hooks and cable means, independent of the power cable to cause the carriage to travel backwards and forwards on the rail.

5 Claims, 2 Drawing Sheets

CABLE HANGER FOR ELECTRICALLY POWERED MINE VEHICLES

The present invention is concerned with power cable hangers and more particularly with electrical power cable hangers positioned between an electrical power source and a remote mobile vehicle.

BACKGROUND AND PROBLEM

For various reasons, not the least of which is providing a better working atmosphere, it is advantageous to employ electrically powered equipment rather than internal combustion powered equipment in a substantially closed working environment such as a mine. Considering only electrically powered equipment, there is a choice between on-board power, e.g., rechargeable batteries and line power. Line power does not suffer from the limitations and weight penalty of rechargeable batteries but does require some means of connecting the moveable operating equipment to a power outlet. Generally, the means takes one of two forms. Once can establish extended exposed conductors which can be contacted by trolleys, pantographs or the like with the attendant danger of accidental contact with such exposed conductors. On the other hand, one can employ an insulated cable extending from a power outlet to the item of equipment being used, such a cable paying out from a reel. If a cable trailing a piece of mobile equipment lies on the floor of a workplace, e.g., a mine, it is likely to be detrimentally affected by water, solvents, abrasion, mechanical contact with other equipment etc. Thus the principal purpose or object of the present invention is to provide a means for minimizing contact of an electrical cable with a floor on which equipment is working. Those skilled in the art will appreciate that the concept of the present invention is applicable not only to electrical cables but also to other power conveying means such as flexible hydraulic or pneumatic lines.

BRIEF DESCRIPTION OF THE INVENTION

The invention comprises a hanging system for suspending at a first elevation (e.g., a roof or ceiling) a flexible power conveying means (e.g., an electrical cable) extending from a power source to a mobile item of equipment and includes rail means mounted at the the roof or ceiling which is higher than and substantially parallel to a second working elevation (e.g., a floor) at which the vehicle works. A carriage is provided which is adapted to travel on the rail means. The carriage bears a laterally extending arm which has a proximal end fixed to said carriage and a free distal end. This arm includes at the distal end means such as rollers for supporting the electrical cable with a minimum of friction while the arm moves with respect to the cable. A plurality of cable hooks are spaced along the path of the rail substantially at the same elevation as the rail. Each of the hooks has an opening for passage of the laterally extending arm of said carriage. Coacting means, for example, cables and winches, independent of the power conveying means are positioned adjacent the power source and on the mobile item of equipment and connected to the carriage for moving the carriage under tension backwards and forwards on the rail.

PARTICULAR DESCRIPTION OF THE INVENTION

Figure 1:
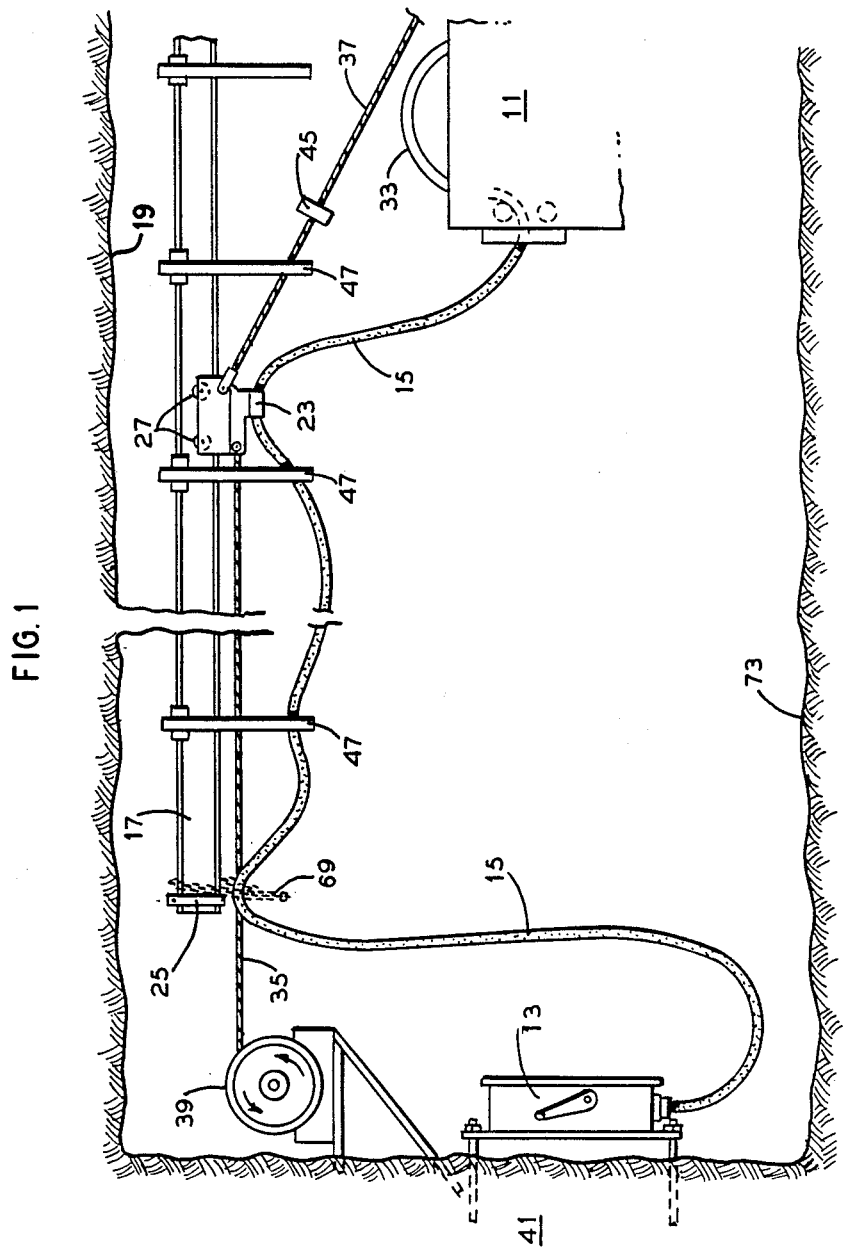
FIG. 1 is an overall side view of the system of the invention.
Figure 2:
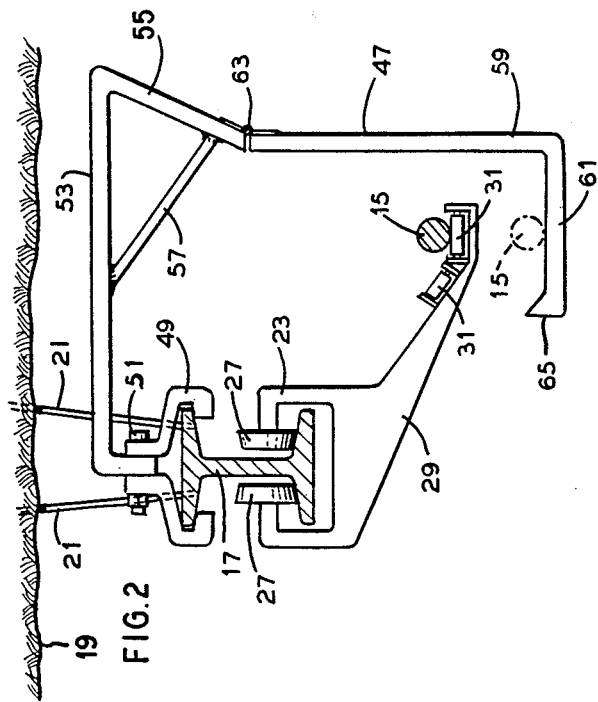
FIG. 2 is a cross-sectional view of the rail, carriage and hook elements of the system of the invention.

Referring to the drawing, the system of the present invention relates to, as depicted in FIG. 1, a remote mobile item of equipment e.g., vehicle 11 operating in a mine on the basis of power, e.g., electric power derived from source 13 and carried to vehicle 11 by means of cable 15. The system of the invention comprises a rail 17 mounted adjacent mine roof 19, as more particularly shown in FIG. 2, by roof bolts 21. Mounted on rail 17 and adapted to travel the length thereof in both directions is carriage 23. As depicted in FIG. 1, travel of carriage 23 off rail 17 is prevented by stop 25. Details of carriage 23 are shown in FIG. 2 wherein carriage 23 is mounted on I-beam rail 17 by means of dollies 27. Carriage 23 bears a downwardly and laterally extending arm at the distal end of which is mounted rollers 31 adapted to support cable 15 without significant friction while carriage 23 moves along rail 17. Electrical cable 15 is paid out and retracted by winch 33 on vehicle 11. Carriage 23 has attached to it one end of cables e.g., steel cables 35 and 37. Steel cable 35 extends from carriage 23 to hydraulic or pneumatic winch 39 mounted on mine wall 41 adjacent power source 13. Steel cable 37 extends from carriage 23 to a pneumatic or hydraulic winch 43 mounted on vehicle 11 shown in FIG. 3 as a load-haul-dump vehicle. Both winches 39 and 43 are constructed and adapted to exert tension on cables 35 and 37 with the tension on cable 37 being greater than the tension on cable 35. Affixed on cable 37 is cable stop 45.

Figure 3:
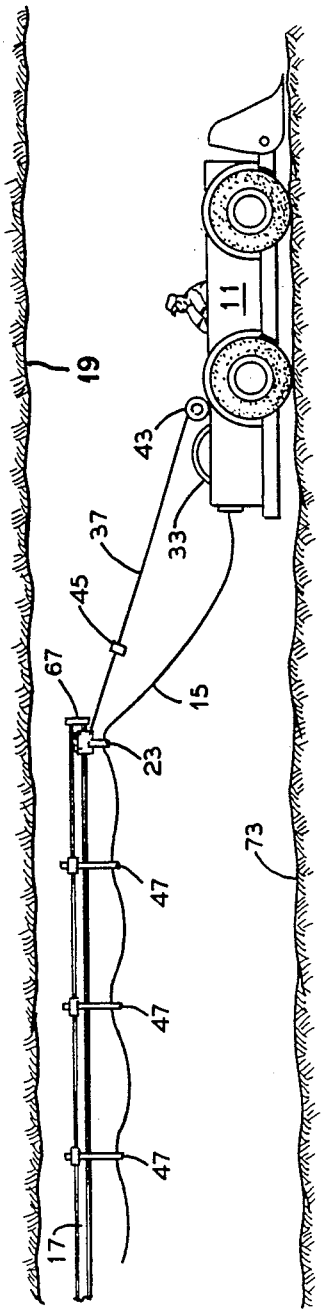
FIG. 3 is another side view of the equipment and of the system of the present invention.

Referring particularly to FIG. 2 a cable hook 47 is depicted as being attached to rail 17 by bracket 49 and bolt 51. Cable hook 47 comprises upper horizontally extending member 53 and downwardly extending member 55 stabilized by brace 57. Hook arm 59 and cable bearing platform 61 are mounted on downwardly extending member 55 by means of hinge 63. As depicted, cable supporting platform member 61 has at its free end lip 65 to inhibit slippage of cable 15 off platform 61. FIG. 2 shows both the position of cable 15 on roller 31 of arm 29 and also (in phantom) on platform 61. Cable hooks 47 are mounted along the length of rail 17 as depicted in FIGS. 1 and 3. Carriage stop 67 is positioned at end of rail 17.

Operation of the system of the present invention entails, if necessary, initially raising cable 15 from the level of power source 13 to that of rail 17 and supporting cable 15 at that level, for example by chains 69. Cable 15 is then placed on rollers 31 on carriage arm 29. Vehicle 11 is then caused to move to the right as shown in FIG. 1 causing carriage 23 to move likewise by virtue of cable 37. At the same time, electrical cable 15 pays out from winch 33 on vehicle 11. Arm 29 of carriage 23 rides under cable 15, positioning cable 15 over hook platform member 61 and, as arm 29 passes each hook 47, it allows cable 15 to fall down on platform member 61. When carriage 23 comes to the end of rail 17 it is prevented from further travel by stop 67, whereupon cable 37 begins to pay out from winch 43 and electrical cable 15, paying out from winch 33 drops to floor 73. Electrical cable 15 hangs from platforms 61 in a catenary or pseudocatenary arc between loci of hooks 47. Spacing of hooks 47 depends upon the amount of allowable hang given the height of the mine roof (or ceiling in other installations) and the height of vehicle and apparatus working on floor 73.

On return, vehicle 11 reverses as does electrical cable winch 33 and cable winch 43. Electrical cable 15 and steel cable 37 reel in. When cable stop 45 reaches winch 43 the tension of winch 43 is relieved whereupon the tension of winch 39 causes cable 35 to reel in. This induces carriage 23 to travel to the left as depicted in FIGS. 1 and 3. As carriage 23 moves leftward, in sequence it lifts electrical cable 15 off platform 61 and free of each of hooks 47 allowing it to be reeled in by winch 33. Hinge 63 allows the lower portion of cable hook 47 to be manually moved out of the way should any hang-up of electrical cable 15 occur. Meeting of carriage 23 with rail stop 25 causes reeling action of powered winch 39 to cease. Those skilled in the art will note that at no time during operation of the system of the present invention is there any significant tension applied to electrical power cable 15. Cable 35 and 37 are tensioned independently of electrical power cable 15 and thus act independent of power cable 15 even though power for winches on board vehicle 11 comes from cable 15.

Those skilled in the art will appreciate that variations can be made from the exact construction of the cable hanging system of the present invention as depicted in the drawings can be made. In particular cable hook 47 need not be mounted on rail 17 but may be mounted independently provided that free space (or freeable space) is allowed for passage of carriage arm 29 within the lateral confines of and above platform member 59. Cable winch 39 need not be placed at or near the power source, but rather it can be at or near the terminus of a cable protective system e.g., a covered channel. Single I-Beam rail 17 can be replaced by any equivalent structure including, if desired, plural or multiple rails. Again, rail 17 can be mounted at any high level with respect to a working floor and not necessarily mounted on a roof or ceiling. The foregoing as well as other alterations, modifications, etc. obvious to one of normal skill in the art are considered to be within the scope and perview of the appended claims.

The embodiments of the invention in which an exclusive property of privilege is claimed are defined as follows.

1. A hanging system for suspending at a first elevation a flexible power conveying means extending from a power source to a mobile item of equipment comprising
   A. rail means mounted at said first elevation higher than and substantially parallel to a second working elevation at which said vehicle works;
   B. a carriage adapted to travel on said rail means said carriage bearing a laterally extending arm having a proximal end fixed to said carriage and a free distal end, said arm including at said distal end means for supporting said power conveying means with low friction;
   C. a plurality of hooks adapted to support said power conveying means and hinged to permit displacement spaced along the path of and substantially at the elevation of said rail means each having an opening for passage of said laterally extending arm of said carriage; and
   D. coacting means independent of said power conveying means positioned adjacent the end of said rail means closer to said power source and on said mobile item of equipment and connected to said carriage for moving said carriage under tension backwards and forwards on said rail means.

2. A system as in claim 1 wherein said power conveying means is an electrical power cable.

3. A system as in claim 1 wherein said first elevation is adjacent the roof of a mine and said second elevation is a working floor of said mine.

4. A system as in claim 1 wherein said means for supporting said power conveying means is at least one roller.

5. A system as in claim 1 wherein said coacting means independent of said power conveying means comprises a winch on said mobile item of equipment, a second winch and cables running from said winches to said carriage said cables being reelable on the reels of said winches.